(12) United States Patent
Ewert et al.

(10) Patent No.: US 8,325,972 B2
(45) Date of Patent: Dec. 4, 2012

(54) ARRANGEMENT AND METHOD FOR NON DESTRUCTIVE MEASUREMENT OF WALL THICKNESS AND SURFACE SHAPES OF OBJECTS WITH AN INNER SURFACE

(75) Inventors: Uwe Ewert, Teltow (DE); Bernhard Redmer, Berlin (DE); Jürgen Müller, Alsdorf (DE)

(73) Assignee: Röntgen Technische Dienst B.V., Rotterdam (NL)

( * ) Notice: Subject to any disclaimer, the term of this patent is extended or adjusted under 35 U.S.C. 154(b) by 645 days.

(21) Appl. No.: 12/311,277

(22) PCT Filed: Sep. 25, 2007

(86) PCT No.: PCT/NL2007/050470
§ 371 (c)(1),
(2), (4) Date: Dec. 28, 2009

(87) PCT Pub. No.: WO2008/039070
PCT Pub. Date: Apr. 3, 2008

(65) Prior Publication Data
US 2010/0119103 A1    May 13, 2010

(30) Foreign Application Priority Data
Sep. 25, 2006  (WO) ............... PCT/NL2006/000473

(51) Int. Cl.
*G06K 9/00* (2006.01)

(52) U.S. Cl. .................................................. 382/100
(58) Field of Classification Search .............. 378/54–59; 703/2–5; 700/153–156; 702/40–44; 356/632–637; 382/100, 141–152
See application file for complete search history.

(56) References Cited

U.S. PATENT DOCUMENTS

| | | | |
|---|---|---|---|
| 2,702,864 A | 2/1955 | McKee | |
| 2,975,281 A | 3/1961 | Williams | |
| 4,725,963 A | 2/1988 | Taylor et al. | |
| 5,379,237 A | 1/1995 | Morgan et al. | |
| 6,377,654 B1 | 4/2002 | Willems et al. | |

FOREIGN PATENT DOCUMENTS

| | | |
|---|---|---|
| GB | 2 085 577 | 4/1982 |
| WO | WO 02/086421 | 10/2002 |

OTHER PUBLICATIONS

International Search Report dated May 9, 2008.

*Primary Examiner* — Atiba O Fitzpatrick
(74) *Attorney, Agent, or Firm* — Jacobson Holman PLLC

(57) ABSTRACT

The invention relates to a method of carrying out measurements with penetrating radiation on a hollow object comprising at least one wall surrounding an inner space of the object, said wall comprising an inner surface and an outer surface, said method at least being carried out for determining a position and shape of at least a portion of the inner surface of the wall.

71 Claims, 4 Drawing Sheets

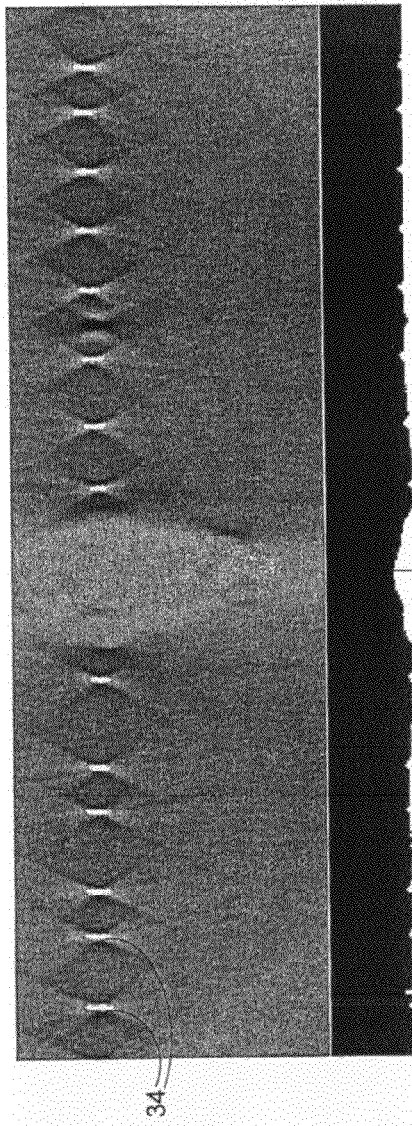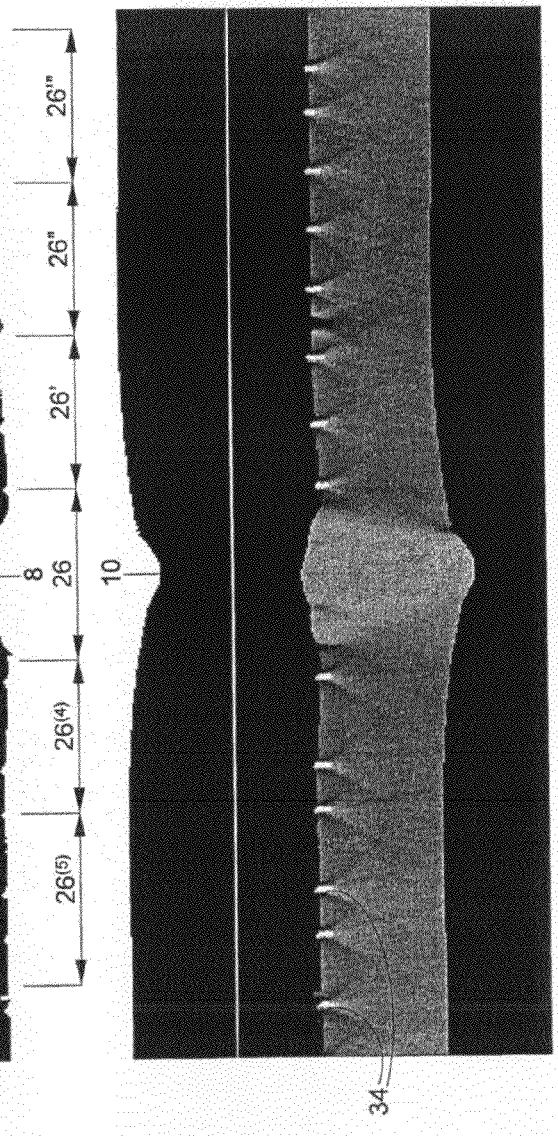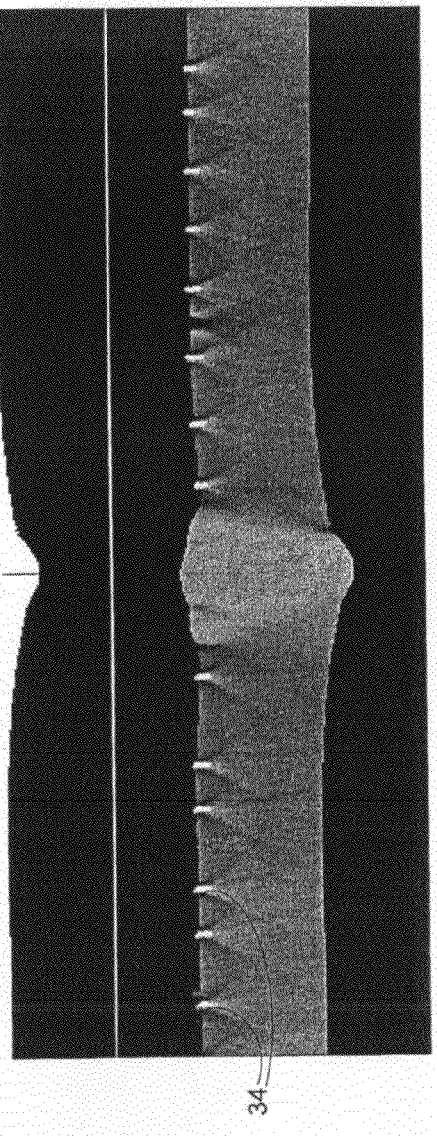

ARRANGEMENT AND METHOD FOR NON DESTRUCTIVE MEASUREMENT OF WALL THICKNESS AND SURFACE SHAPES OF OBJECTS WITH AN INNER SURFACE

This is a national stage of PCT/NL2007/050470 filed Sep. 25, 2007 and published in English, which has a priority of Netherlands no. PCT/NL2006/000473 filed Sep. 25, 2006, hereby incorporated by reference.

The invention relates to a method of carrying out measurements with penetrating radiation on a hollow object having an axial axis and comprising at least one wall surrounding an inner space of the object, said wall comprising an inner surface and an outer surface, said method at least being carried out for determining a position and shape of at least a portion of the inner surface of the wall.

In the method, the position of at least a portion of the inner space of the wall may be defined relative to the remainder portion of the object. It may however also be defined relative to a known fixed position in the environment of the object.

A method for determining wall thickness of at least partially tubular objects is known from U.S. Pat. No. 6,377,654. This method requires that a tubular part of the object is transradiated by radiation emitted from a radiation source. A recording of a radiation image of said tubular part with the aid of a radiation detector is carried out. Furthermore, the radiation image is converted into a digital image. Subsequently an attenuation profile is taken from said digital image on a straight line, said attenuation profile comprising a tangential image of the wall of the tubular part of the object and a section outside the tubular object and a section inside the tubular object. Hence, it is required that a complete tubular part of the object is irradiated by the radiation source.

Subsequently, the attenuation profile is reflected in the direction of the centre of the object to obtain a measured reflected attenuation profile. Then a relative density distribution of the object is reconstructed by means of a transmission tomographic projection reconstruction method. Subsequently, a density profile is selected from this relatively density distribution by scanning on a straight line through the midpoint of the object. Then, positions are determined of outer and inner surfaces of said wall from said density profile. Finally, the wall thickness is determined from the spacing between the positions of the outer and inner surfaces of the wall.

A disadvantage of this known method is that it provides only a wall thickness information for the tangential part of the wall. Beginning local pitting from inside is usually not detectable. The said technique is based on the penetration of the inner tangential wall which limits the invention to tubular objects with low wall thickness and diameter, since X-rays and gamma rays are limited by the maximum penetrated material thickness at the inner tangential direction of tubular objects. The arrangement and method described here does not need the penetration of the tangential part of any hollow or tubular object since it provides best information from walls in perpendicular arrangement to the radiation. Therefore, the invention extends the application range of patent U.S. Pat. No. 6,377,654 considerably to objects with higher diameter and wall thickness and/or allows the application of low energy radiation which reduces the controlled area for radiation protection and reduces measurement time and is of less danger for people close to the working area. An object of the invention is however to at least determine a position and shape of at least a portion of the inner surface of the wall.

According to the invention, the method comprises the following steps:

a. transmitting radiation such as X-ray radiation or gamma radiation through the object such that the radiation is transmitted through at least the at least one first portion of the wall to be examined and through other second portions of the wall of the object by means of at least one radiation source;

b. receiving radiation which has travelled through said portions of the wall by means of at least one detector unit for registering at least one radiation image of the object, said at least one radiation image representing the positions where the radiation is received together with the intensity of the received radiation on said positions;

c. creating signals by means of at least the at least one detector unit which signals represent the registered at least one radiation image;

d. feeding said signals to at least one computer;

e. providing the computer at least with (i) information about at least one attenuation coefficient of the wall material or wall materials for the used radiation and/or the function of attenuation of the wall thickness of the wall material or wall materials for the used radiation, (ii) information about the used positions and directions of the transmitted radiation relative to the object and (iii) the at least one used position and optionally the used at least one orientation of the radiation detector relative to the object and/or information which can be derived there from (i, ii, iii) such as an expected attenuation of the radiation when the radiation has travelled through the object as a function of (local) wall thicknesses of the at least one first portion of the wall, optionally the second portions of the wall and travelling directions and positions relative to the object of the radiation travelling through the object;

f. calculating by means of the computer an estimated position and shape of the inner surface of the at least one first portion of the wall and optionally calculating an estimated position and shape of the inner surfaces of the second portions of the wall on the basis of the registered at least one radiation image on the one hand and on the basis of at least the information provided in step e. on the other hand;

g. changing in step a. at least one time the position of the radiation source relative to the object in a direction comprising at least a component in the direction of the axial axis such that in step a. the radiation is first transmitted through the object wherein the radiation is transmitted through at least the at least one first portion of the wall to be examined and through one of the second portions of the wall by means of the at least one radiation source for registering a first radiation image and such that in step a. after the position of the radiation source is changed at least one time the radiation is subsequently transmitted through at least the at least one first portion of the wall to be examined and through a second portion of the wall which differs from a second portion of the wall through which the radiation was previously transmitted, for registering at least one further radiation image which differs from the previously obtained radiation image, wherein the directions of the transmitted radiation relative to the first portion of the wall changes if the radiation source is moved in the direction having a component in the direction of the axial axis, said first registered radiation image and said at least one further registered radiation image being used in step f. for carrying out said calculations. Hence the radiation images are used in combination in step f. for carrying out set calculations.

According to the invention, the position and shape of the inner surface of the at least one first portion of the wall can be estimated with a relatively high accuracy. The estimated shape of the inner surface may be both a line segment of the inner surface as well as a plane segment of the inner surface.

In step f. the registered radiation images on the one hand and the information provided in step e. on the other hand are used to calculate the estimated position and shape of the inner surface of the at least one first portion of the wall. According to the invention, the calculation may be carried out in different ways. The idea is that information provided in step e. together with the (to be determined) position and shape of the inner surface of the at least one first portion of the wall, the position and shape of the inner surfaces of the second portions of the wall (also to be determined if the information about position and shape of the inner surfaces of the second portions of the wall is not provided to the computer) and the positions and shapes of the outer surface of the at least one first position of the wall and the second portions of the wall (also to be determined if the information about position and shape of the outer surface of the first portion of the wall and the second portion of the wall is not provided to the computer) should provide an attenuation of the radiation corresponding to the obtained radiation images. In other words, the position and shape of the inner surface of the at least one first portion of the wall and optionally (if not known) the position and shape of the inner surfaces of the second portions of the wall and optionally (if not known) the position and shape of the outer surfaces of the at least one first position of the wall and the second position of the wall should be selected such that attenuations are obtained, corresponding to the obtained radiation images. Whether or not also the position and shape of the inner surface of the second portions of the wall will be determined on the basis of the obtained radiation images depends on whether the position and shape of the inner surfaces of the second portions of the wall is known or not. The same applies to the position and shape of the outer surface of the at least one first portion of the wall and the second portion of the wall. In such method it may be that the attenuation coefficient of the wall material or the materials is known or that the attenuation as a function of the (local) wall thickness of the wall is known. In addition, it may be that information about position and direction of the transmitted radiation relative to the object is known together with the used positions and optionally the used at least one orientation of the radiation detector relative to the object. The information about the orientation of the radiation detector may be required of the recorded radiation images depend on this orientation. It may however also be that the computer is provided with other information which can be derived therefrom.

If, for example, the object is a pipeline provided with a weld, in general the shape and position of the outer surface and the inner surface of the pipeline is known, except for positions where a weld is present. The method according to the invention may be applied such that the first portion of the wall to be examined is the portion of the pipeline which is provided with a weld. The other second portions of the wall may be selected such that it generally or most of the time does not comprise the weld so that the inner surface and the outer surface of the second portions of the wall are relatively well known. Also the outer surface of the first portion of the wall may be well known because it is for example visible. Hence, in such case the relative well known position and shape of the outer surface of the first portion of the wall and the position and shape of the outer surface of the second portions of the wall and also the position and shape of the inner surface of the second portions of the wall may be used by the computer as a start for carrying out calculations for determining the position and shape of the inner surface of the first portion of the wall. Basically, radiation images of the position and shape of the inner surface of the first portion of the wall (which in this example comprises the weld) may be estimated. In subsequent further steps the shape and position of, for example, the inner surface of the second portions may also be varied to obtain a better fit with the obtained radiation images. The same applies to the outer surfaces of the first and second portions of the wall. Also the place and shape of these surfaces may be varied to obtain a better fit with the obtained radiation images.

The more radiation images are obtained, the more accurate the position and shape of the inner surfaces of the at least one first portion and the second portions may be calculated. As explained, the calculation may comprise a method wherein a best fit is required on the basis of some starting values for the position and shape of the inner surfaces of the first and second portions of the wall wherein an iterative process is carried out for obtaining the best fit.

Moreover, the position and shape of the outer surfaces of the first portion and the second portions may also be varied to further improve the fit. It may also be that the position and shape of the outer surface of the first portion of the wall and the position and shape of the outer surface and inner surface of the second portions of the wall are not (well) known. In that case the computer may start calculation on the basis of a (possible computer generated) first estimation of these positions and shapes. In further calculations these estimations may be improved as discussed above to obtain a better fit.

It is noted that in general the method may be carried out for a plurality of different first portions of the wall. Preferably the plurality of first portions of the wall are adjacent.

According to a first special embodiment of the invention, in step f. an estimated position and shape of the inner surface of the at least one first portion of the wall and an estimated position and shape of the outer surface of the at least one first portion of the wall is calculated and optionally an estimated position and shape of the inner surfaces of the second portions of the wall and/or an estimated position and shape of the outer surface of the second portions of the wall are calculated on the basis of the registered radiation images on the one hand and on the other hand on the basis of at least the information provided in step e. According to this embodiment it may be desired to obtain information about the position and shape of both the inner surface as well as the outer surface of the first portion of the wall wherein the outer surface of the first portion is not well known. In that case, the position and shape of the inner surface of the first portion as well an improved position and shape of the outer surface of the first portion may be calculated so that they provide a good fit with the obtained radiation images.

According to a second special embodiment of the invention, in step f. an estimated position and shape of the inner surface of the at least one first portion of the wall and an estimated position and shape of the outer surface of the at least one first portion of the wall are calculated and optionally an estimated position and shape of the inner surfaces of the second portions of the wall and/or an estimated position and shape of the outer surface of the second portions of the wall are calculated on the basis of the registered radiation images on the one hand and on the other hand on the basis of a provided relation between attenuations of the radiation transmitted by the radiation source, travelling through the object and received by the radiation detector on the one hand and possible positions and directions of the radiation relative to the object and possible (local) thicknesses of the at least one first portion of the wall and second portions of the wall on the other hand. It is noted that the position and direction of the radiation relative to the object and local thicknesses of the first and second portions of the wall provide information about a total length of portions of the path along which the radiation travels within the material which length together with the attenuation coefficient of the material determines amongst others the attenuation of the radiation. The actual attenuation of the radiation is registered by means of the radiation images. On the basis of the radiation images and said provided radiation, the local thicknesses of the first and second portions of the wall can be estimated. Subsequently, according to this embodiment, on the basis of a known place and shape of the outer surfaces of the first and second portion the place and shape of the inner surfaces of the first and second portions can be determined. It may however also be that the place and position of these inner surfaces is also estimated in the method. It is noted that the relation between attenuations of the radiation transmitted by the radiation source on the one hand and possible positions and directions of the radiation relative to the object and possible (local) thicknesses of the first and second portions of the wall on the other hand, may be obtained by the use of calibration pieces.

According to a third special embodiment of the invention, in step f. by means of the computer an estimated position and shape of the inner surface of the at least one first portion of the wall and the outer surface of the at least one first portion of the wall and optionally an estimated position and shape of the outer surface of the second portions of the wall and/or an estimated position and shape of the inner surface the second portions of the wall is calculated on the basis of the registered radiation images on the one hand and on the other hand on the basis of a provided relation between attenuations of the radiation transmitted by the radiation source, travelling through the object and received by the radiation detector on the one hand the at least one of the attenuation coefficient of the material of the object for the used radiation, possible geometries of the object, the used positions and optionally the used at least one orientation of the radiation source relative to the object or the places and directions of the radiation relative to the object, and the used at least one position and optionally the used at least one orientation of the radiation detector relative to the object on the other hand. The orientation of the radiation source may be required if the direction and/or intensity of the radiation depends on this orientation. The method is carried out on the basis of different information than the method according to the second special embodiment.

Preferably the method further comprises the step of:
h. providing the computer with information about a position and shape of the outer surface of the at least one first portion of the wall and with information about a position and shape of the outer surface of the other at least one second portion of the wall, said information also being used in step f. in combination with the information provided in step e. to the computer for carrying out set calculations. This may be advantageous if the position and shape of the outer wall can be easily determined because it is visible.

According to a special embodiment of the invention, the following steps are carried out for carrying out step f:
i. determining by means of the computer approximated radiation images when said radiation source is in said positions relative to the object, said determination for obtaining approximated radiation images being carried out by means of a first predetermined algorithm which is applied on the basis of the provided positions and shapes of the outer surfaces in step h. or a first estimation of the positions and shapes of the outer surfaces, on the basis of the used positions and optionally the used at least one orientation of the radiation source relative to the object, the used at least one position and optionally the used at least one orientation of the radiation detector relative to the object and an estimation of the positions and shapes of the inner surfaces of the at least one first portion of the wall and the second portions of the wall and on the basis of the information of the at least one attenuation coefficient of the material of the wall for the used radiation and the geometry of the object or information which can be derived there from;
j. calculating by means of the computer differences between the approximated radiation images and the respective corresponding registered radiation images;
k. calculating by means of a second predetermined algorithm as a function of the calculated differences a new estimated position and shape of the inner surface of the at least one first portion of the wall and optionally new estimated position and shape of the inner surface of the second portions of the wall and optionally a new estimated position and shape of the outer surface of the at least one first portion of the wall and optionally a new estimated position and shape of the outer surface of the second portions of the wall ;
l. repeating steps j. and k. until the differences obtained in step j. fulfil a predetermined requirement;
m. providing the estimated position and shape of the inner surface of the at least one first portion of the wall belonging to differences which fulfil the predetermined requirement.

As explained above, it may be that only a new estimation for the position an the shape of the inner surface of the first portion is calculated wherein the (known or estimated) place and shape of the outer surface of the first portion, the (known or estimated) position and shape of the outer surface of the second portions as well as the (known or estimated) position and shape of the inner surface of the second portions remain the same. It may however also be that both a new estimation for the position and shape of the inner surface of the first and second portion is calculated. More specifically, it may be that as well a new position and shape for the outer surface of the first portion and/or the second portions is calculated. The latter calculations may preferably be carried out in case a large number of approximated radiation images are obtained Preferably it holds that in steps i., j., k. and l. an iterative method for obtaining a best fit between the approximated radiation images and the registered radiation images based on at least square root method is carried out.

According to a special embodiment of the invention, the method further comprises step n. wherein the object is provided with markers on the outer surfaces of the at least one first portion of the wall and the second portions of the wall and wherein by means of the radiation source, radiation detector and the computer the positions of the markers is obtained by another method such as computed tomography, computed planar tomography or computed laminography, wherein the computer in step h. is provided with the position and shape of the outer surface of the at least one first portion of the wall and the position and shape of the outer surface of the second portions of the wall on the basis of the obtained positions of the markers.

This is a very suitable way to determine the place and shape of said outer surfaces. As explained, it can also be done by a visual inspection, however, this is not always possible and moreover the method wherein computed planar tomography or computer laminography is used, is more accurate than a visual inspection including possible manual measurements.

Preferably in that case the position of the markers is obtained by translational laminography or rotational laminography. Preferably, the computed planar tomography or computed laminography and the determination of the shape and position of the inner surface of the at least one first portion of the wall are obtained on the basis of one and the same measurement which is carried out by means of the radiations source and the radiation detector. The latter may be determined by use of the markers as explained above.

According to a special embodiment of the invention it holds that the shape of the inner surfaces and the shape of the outer surfaces are formed by a line segment of said inner and outer surfaces respectively. According to a special embodiment it also holds that in step g. the radiation source is moved along a straight line. Preferably it holds that the line segments run parallel to the straight line. According to a special embodiment the radiation source generates a fan beam. Preferably in that case the line segments run in a plane of the fan beam.

The method according to the present invention is specifically advantageous if the object has a longitudinal shape. Preferably in that case the straight line extends in a longitudinal direction of the object. Also preferably in that case the line segments extend in a longitudinal direction of the object. More specifically in that case the object is a pipeline.

According to a highly advantageous embodiment of the present invention the method further comprises step o. wherein by means of the radiation source, the radiation detector and the computer an image of the material of the at least one first portion of the wall is obtained by another method such a computed tomography, computed planar tomography or computed laminography such that said image of the material shows information about the position and shape of inhomogeneities in the material. Computed planar tomography or computer laminography are especially used for objects where the well known 3D tomography cannot be used. If, for example, an object has a longitudinal shape it is not possible to obtain radiation images which are obtained under a plurality of angles which are distributed over 360° around the object. This means that there is a limited view condition (dead angle effect). Methods wherein images of the materials are obtained under a limited view angle are known as computed planar tomography or computed laminography. A drawback of such methods is that the obtained image of the material does not show information about inhomogeneities which extend in a longitudinal direction of the object. This also means that it does not show the place and the position of an inner or outer surface of the object which extends in a longitudinal direction of the object. This is caused by the fact that when using computed planar tomography or computed laminography, radiation can not travel through the object in the longitudinal direction of the object for obtaining information to construct an image of the material of the first portion of the wall. This is caused by the fact that, in use, the longitudinal object cannot be positioned between the radiation source and the radiation detector so that the radiation travels through the object in a longitudinal direction. The length of the object in the longitudinal direction is simply greater than the distance between the radiation source and the radiation detector. According to a highly advantageous embodiment the method according to the invention comprises the step of p. combining by means of the at least one computer the image of the material of the at least one first portion of the wall and the obtained position and shape of the inner surface of the at least one first portion of the wall so as to obtain a second image which shows information about the position and shape of said inhomogeneities of the material in the at least one first portion of the wall in combination with information about the position and shape of the inner surface of the at least one first portion of the wall. Now the second image comprises also information about the position and shape of the inner surface of the at least one first portion of the wall in addition to the image of the material of the wall as such. Preferably the method comprises the step of q. combining by means of the at least one computer the image of the material of the at least one first portion of the wall and the obtained position and shape of the outer surface of the at least one first portion of the wall so as to obtain the second image which shows information about the position and shape of said inhomogeneities of the material in the at least one first portion of the wall in combination with information about the position and shape of the inner surface and the outer surface of the at least one first portion of the wall. In that case the second image provides a clear representation of the at least one first portion of the wall. It shows both the material of the wall as well as the outer and inner surface of the wall. According to a special embodiment the image of the material at least comprises an image of the material laying in a plane which extends through the inner surface and the outer surface of the at least one first portion of the wall wherein the second image shows the position and shape of the inner surface of the at least one first portion and the outer surface of the at least one first portion respectively said inner surface and outer surface each being a line segment laying in said plane.

Preferably, said image of the material of the at least one first portion of the wall and the shape and position of the inner surface of the at least one first portion of the wall are obtained on the basis of one and the same measurement which is carried out by means of the radiation source and the radiation detector. This makes the method relatively cheap. Also preferably, the computed planar tomography or computed laminography and the determination of the shape and position of the inner surface of the at least one first portion of the wall are obtained on the basis of one and the same measurement which is carried out by means of the radiations source and the radiation detector. The latter may be determined by use of the markers as explained above.

According to a highly preferred embodiment in step n. a reconstruction method is used such as FBR or ART, wherein in said reconstruction methods information about the determined position and shape of the inner surface of the at least one first portion of the wall and/or the determined position and shape of the inner surface of the second portions of the wall and/or the determined position and shape of the outer surface of the at least one first portion of the wall and/or the determined position and shape of the outer surface of the second portions of the wall are used. In view of the above it will be clear for the skilled man in the art that not only reconstruction methods such as FBR or ART but also other known reconstruction methods can be improved by using information about the determined position and shape of the inner surface of the first portion and/or the determined position and shape of the inner surface of the second portion. The same applies for the determined position and shape of the outer surface of the first portion and/or the determined position and shape of the outer surface of the second portion.

According to a special embodiment a radiation detector is stationary relative to the object. It is however also possible that the radiation detector is stationary relative to the radiation source. The radiation detector may be a flat panel detector or a line detector. The radiation detector may even be a point detector which can be positioned in different locations relative to the object for obtaining the radiation images. The information provided to the computer in step g. may be obtained by measuring attenuations of the radiation and calibration pieces. The calibration pieces may have wall thicknesses which correspond with possible wall thicknesses expected to be present in the object.

It is possible that the object is filled with a substance such as a liquid wherein optionally in the method a correction for attenuation of the radiation by the substance is carried out. It will be apparent in view of the above for the skilled man that in the method a correction for attenuation of radiation by the substance may be carried out. The substance provides an additional attenuation of the radiation travelling through the object which may be acknowledged in the performed calculations. It will also be apparent for the skilled man in view of the above that in the method a correction for scattering may be carried out.

The invention also relates to a method of carrying out irradiation test on hollow objects comprising a wall surrounding an inner space of the object, in order to determine the position and shape of inhomogeneities of material of the wall, said wall comprising an inner surface and an outer surface, said method comprising the steps of:

a. transmitting radiation such as X-ray radiation or gamma radiation through the object such that the radiation is transmitted through at least at least one first portion of the wall to be examined and through another second portion of the wall of the object by means of at least one radiation source;
b. receiving radiation which has travelled through said portions of the wall by means of at least one detector unit for registering at least one radiation image of the object, said radiation image representing the positions on the detector where the radiation is received together with the intensity of the received radiation on said positions;
c. creating signals by means of the at least one detector unit which signals represent the registered radiation image;
d. feeding said signals to at least one computer;
e. creating a first image of the material of said at least one first portion of the wall by means of said computer and based on said signals, such that said first image shows information about the position and shape of said inhomgeneities and covers also at least a portion of the inner surface of the at least one first portion of the wall including its bordering surroundings outside the wall and at least a portion of the outer surface of the at least one first portion of the wall including its bordering surroundings outside the wall;
f. calculating by means of the computer an estimated position and shape of the inner surface of the at least one first portion of the wall and optionally calculating an estimated position and shape of the outer surface of the at least one first portion of the wall on the basis of the at least one registered radiation image on the one hand and on the other hand on the basis of a provided relation between attenuations of the radiation transmitted by the radiation source, travelling through the object and received by the radiation detector, the at least one attenuation coefficient of the wall material of the object for the used radiation or wall materials and/or the function of attenuation of the wall thickness of the wall material or wall materials for the used radiation, and the direction and position of the radiation relative to the object;
g. combining by means of the at least one computer the first image of the material and the obtained position and shape of the inner surface of the at least one first portion of the wall so as to obtain a second image which shows information about the position and shape of said inhomogeneities of the material in the at least one first portion of the wall in combination with information about the position and shape of the inner surface of the at least one first portion of the wall.

A system according to the invention for carrying out the method according to any preceding claim, provided with at least radiation source, at least one a radiation detector, at least one transport device for changing the position and/or orientation of the radiation source and/or the position of the radiation detector relative to the object and a computer comprising software for carrying out the calculations of the method.

A possible example of a method according to the invention will now be discussed on the basis of the following figures wherein:

FIG. 2A shows an image of material of an object which may be obtained by the system of FIG. 1.

FIG. 2B shows estimated position and shape of portion of the wall of the object of FIG. 2A and obtained by a method according to the invention.

FIG. 2C shows an image based on FIGS. 2A and 2B and obtained by a method according to the invention.

Figure 1:
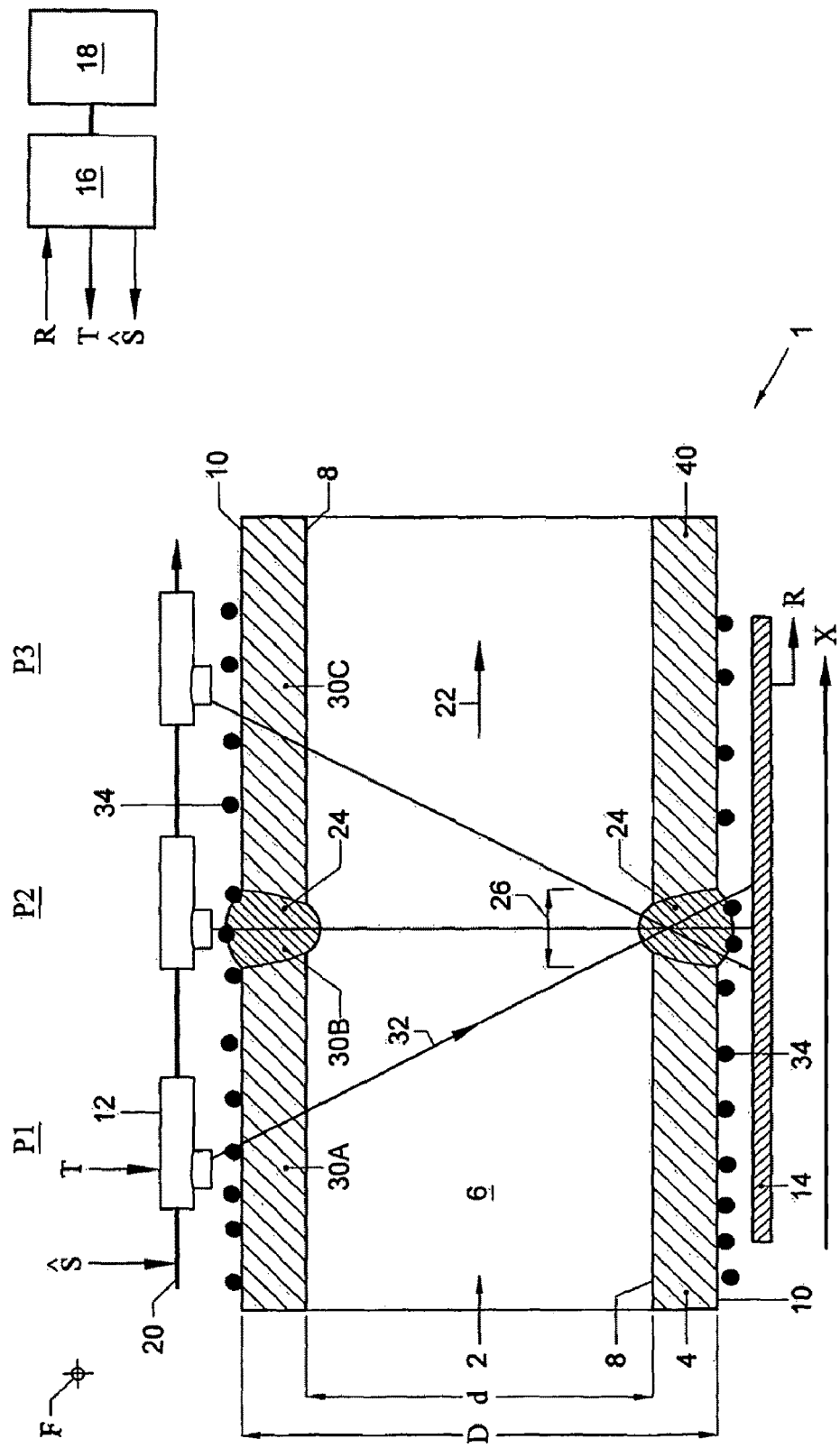
FIG. 1 shows a system according to the invention for carrying out a method according to the invention.

In FIG. 1 with reference number 1 a system according to the invention is shown for carrying out an irradiation test on a hollow object 2. The hollow object comprises at least one wall 4 surrounding an inner space 6 of the object. Said wall comprising an inner surface 8 and an outer surface 10.

The system is provided with a radiation source 12, for generating in this example X-ray radiation, a flat plate detector 14, a computer 16 and a display 18. Furthermore, the system is provided with a transport device 20 for changing the position of the radiation source 12. In FIG. 1 the transporting device 20 is shown schematically by means of a straight line along which the radiation source may be transported. The transport device 20 is controlled by control signals ŝ generated by the computer 16. Furthermore the radiation source 12 is controlled by control signals T, generated by the computer 16. Signals R, generated by the flat plate radiation detector are submitted to the computer 16.

In the present example, the object has a longitudinal shape more particularly the object is a pipeline having a longitudinal direction 22 which forms also the axial axis 22 of the pipeline. Furthermore the pipeline is provided with a weld 24.

In this example, by means of the system, a method is carried out for determining the position and shape of the inner surface 8 of at least a first portion 26 of the wall 4. As shown in FIG. 1 the first portion 26 of the wall comprises the weld 24.

The position of the inner surface of the first portion of the wall may be defined relative to the remainder of the object or may be defined relative to a stationary point F in the environment of the object. The reason that the position of the inner surface of the at least one first portion of the wall has to be defined is that if it should be possible to combine the shapes of a plurality of first portions of the wall into a single image which shows then the shape of a larger (or complete) inner surface of the wall the positions of the inner surface of the first portions of the wall relative to each other should be known. Hence, not only the shape of the inner surface of the first portion is obtained, but in this example also its position relative to, in this example, the remainder of the object. In this example the position and shape of the outer surface 10 of the wall is known. The position and shape of the inner surface 8 of the wall is not known and the position and shape of the inner surface of the first portion of the wall 26 has to be determined.

In use, radiation such as X-ray radiation or gamma radiation, is transmitted through at least the first portion of the wall to be examined and through another second portion 30A of the wall by means of the radiation source 12 when the radiation source 12 is in the position P1. In this example, the radiation source generates a fan beam laying in a plane of the drawing shown in FIG. 1. The radiation travels through the second portion 30A of the wall and through the first portion of the wall 26 and is subsequently received by the detector unit 14 which is in this example stationary relative to the object.

The detector unit is used to register a radiation image of the object wherein said radiation image represents the position where the radiation is received together with the intensity of the received radiation on said positions.

The detector 14 generates signals representing the registered radiation image. In this example the image is a line segment because the radiation source generates a fan beam.

The signals R generated by means of the detector 14 are fed to the computer 16. Subsequently the computer 16 deactivates the radiation source.

Furthermore, the computer 16 controls the transport device 20 so as to move the radiation source 12 to a new position P2. The transport device moves the radiation source in a direction having a component extending in the axial direction 22. In this example the transport device moved to radiation source in a direction extending in the axial direction to the position P2. In the position P2 the computer activates the radiation source such that the radiation is transmitted through another second portion 30B of the wall and through the first portion 26 of the wall. Again by means of the detector 14, a radiation image is obtained and the corresponding signals are fed to the computer 16. Subsequently the computer 16 deactivates the radiation source and moves the radiation source in the axial direction 22 to a third position P3. Then the computer activates the radiation source such that radiation is transmitted through another second portion 30C of the wall and again through the first portion 26 of the wall. Signals representing the radiation image obtained are fed to the computer 16. It may also be that the computer does not deactivate the radiation source, so that it remains activated during inspection of the object.

As explained in this example the place and shape of the outer surface 10 of the wall is known. The information about the place and shape of the outer surface 10 is supplied to the computer 16. In this example the object is a pipeline so that the outer surface forms a cylinder having a diameter D. In fact the values of this diameter D is supplied to the computer. Only there where the weld 24 is present, the diameter is larger. In this example the diameter D (x) is a function of a position x in the longitudinal direction 22 of the first object is provided to the computer. This means that in this example the computer is provided with information about a position and shape of the outer surface of the first portion of the wall and with information about a position and shape of the outer surface of the other second portions of the wall. As explained later, it is also possible that the computer is only supplied with the value of the diameter where the weld is not present.

Furthermore, the computer is provided with information about the attenuation coefficient of the wall material for the used radiation. In this example it is assumed that the attenuation coefficient μ is the same everywhere in the wall including the weld 24.

Furthermore, the computer is provided with information about the geometry of the object. In this example the information about the geometry of the object includes, apart from the already mentioned diameter D (x), as a function of the position x also an estimation of the inner diameter d of the object. It is assumed, as a starting value, that the diameter d (x) as a function of the position x is the same for each value of x. As is clear from the drawing this is however not true for the position where the object is provided with the weld 24.

Hence, the position and shape of the inner surfaces of the second portions 30A, 30B of the wall are relatively well known whereas the position and shape of the inner surface of the second portion 30A of the wall is only roughly known and the position and shape of the inner surface of the first portion 26 of the wall is also roughly known. The portion and shape of the outer surface of the first portion and the second portion is also well known in this example.

The attenuation of the radiation received by the detector 14 when the radiation source is in the position P1 is determined amongst others by the length of the path along which the radiation travels in the second portion 30A of the weld as well as the length of the path along which the radiation travels through the first portion of the weld. The length of the path through the second portion 30A of the weld can be estimated from the travelling direction of the radiation and the position of the radiation relative to the object on the one hand and the wall thickness of the second portion 30A of the wall which can be estimated as (D (x=P1)−d(x=P1))/2. The length of the path wherein the radiation travels through the first portion of the wall depends again on the travelling direction 32 of the radiation, the position of the radiation and the place and shape of the outer surface of the first portion 26 of the wall and the place and shape of the inner surface of the first portion 26 of the wall. As explained, the place and shape of the outer surface of the first portion of the wall is roughly known as a starting value or first estimation so that the main unknown factor is the place and shape of the inner surface of the first portion of the wall. Hence, the attenuation received by the detector provides information about the place and shape of the inner surface of the first portion of the wall. This attenuation is reflected by the radiation image determined by the detector and by said signals which are fed to the computer.

What herefore has been explained for the attenuation and radiation image when the radiation source is in position P1 applies mutatis mutandis to the attenuation and radiation image when the radiation source is in position P3. When the radiation source is in the position P2 the main difference is that the wall thickness of the second portion 30B of the wall is less accurately known because of the unknown shape of the inner surface of the second portion 30B of the wall. Hence in this embodiment the radiation is transmitted through the object such that the radiation extends generally in a plane which is parallel to the axial axis 22 (in this example the plane of the drawing) and such that the radiation is transmitted through at least the at least one first portion of the wall to be examined and through one of the other second portions of the wall by means of at least one radiation source for registering a first radiation image. In this embodiment it holds that the axial axis 22 lays in said plane (in this example the plane of the drawing). It is also possible that said plane runs parallel to the plane of the drawing. In both cases it holds that the radiation in addition may also extend outside the plane. The radiation may extend also outside the plane if for example a cone beam is used. In that case the radiation also extends generally in the plane and it holds that the radiation at least extends generally in the plane. Furthermore at least one time the position of the radiation source relative to the object in the axial direction of the object is changed such that the radiation is transmitted through at least the at least one first portion of the wall to be examined and through a second portion of the wall which differs from a second portion of the wall through which the radiation was previously transmitted for registering at least one further (new) radiation image which differs from a previously obtained radiation image, wherein the directions 32 of the transmitted radiation relative to the first portion of the wall changes if the radiation source is moved in a direction having a component in the axial direction 22.

As a first estimation or starting value it is however assumed by the computer that the inner surface of the second portion 30B of the wall is the inner surface of the unwelded pipe with nominal wall thickness.

Based on this assumption, the computer can calculate by means of a first algorithm as explained above for each of the positions wherein the radiation source transmits the radiation, and approximated radiation images. Subsequently, the computer calculates differences between the approximated radiation images and the respective corresponding registered radiation images. Furthermore, on the basis of these differences the computer calculates by means of a second predetermined algorithm a new estimated position and shape of the inner surface of the first portion of the wall. Optionally the computer may also calculate new estimated positions and shapes of the inner surfaces of the second portions of the wall. Based on the new estimated position and shape of the inner surface of the wall and the optionally new estimated position and shape of the inner surface of the second portions of the wall, the computer determines three new approximated radiation images by means of the first algorithm in the same manner as in which the first three approximated radiation images are obtained. The new approximated radiation images are subsequently compared by the computer with the corresponding registered radiation images. The computer again calculates differences between the approximated radiation images and the respective corresponding registered radiation images. Based on the calculation of these differences the computer may again on the basis of the second predetermined algorithm, calculate a new estimated position of the inner surface of the first portion and optionally new estimated position and shape of the inner surface for each of the second portions. This process may be repeated until the differences obtained fulfil a predetermined requirement. When the process is ended, an estimated position and shape of the inner surface of the first portion of the wall is determined. Optionally, an estimated position and shape of the outer surface for each of the second portions of the wall may be obtained as well.

Hence, it follows that in this example an irradiate method for obtaining the best fit between the approximated radiation images and the registered radiation images is carried out. In this example the irradiate method for obtaining a best fit between the approximated radiation images and the registered radiation images is based on a least square route method. In the above it holds that said first registered radiation image and said at least one further registered radiation image are used in combination for carrying out said calculations.

In the above, it holds therefore more specifically that by means of the computer approximated radiation images are determined which are respectively obtained when said radiation source is in said positions relative to the object, said determination for obtaining approximated radiation images being carried out by means of a first predetermined algorithm which is applied on the basis of the provided positions and shapes of the outer surfaces or a first estimation of the positions and shapes of the outer surfaces (which first estimation may be generated by the computer itself), on the basis of the used positions and used orientation of the radiation source relative to the object, the used position and used orientation of the radiation detector relative to the object and an estimation of the positions and shapes of the inner surfaces of the at least one first portion of the wall and the second portions of the wall and on the basis of the information of the at least one attenuation coefficient of the material of the wall for the used radiation and the geometry of the object or information which can be derived there from. It holds further that in said first algorithm the approximated radiation images are obtained by calculating an expected attenuation of the radiation caused by the travelling of the radiation through said portions of the wall, said attenuation depending on the length of the path along which the radiation travels in the material and the attenuation coefficient of the material wherein the length of said path depends on the used positions and used orientation of the radiation source relative to the object, the position and shape of the outer surface of the at least one first portion of the wall, the estimated position and shape of the inner surface of the at least one first portion of the wall, the position and shape of the outer surface of the second portions of the wall and the estimated position and shape of the inner surface of the second portions of the wall.

In the above method also improved position and shape of the outer surface of the first portion of the wall and/or an improved position and shape of the outer surface of the second portions of the wall may be estimated in the iterative process. Also an improved estimation of the position and shape of the inner surface of the second portion of the wall may be calculated. This can especially be carried out when a large number of radiation images are obtained when the radiation source is in a large number of different positions. Hence, in that case there is a lot of information available for carrying out a best fit for not only the inner surface and outer surface of the first portion of the wall, but also for the inner surface and outer surface of the second portions of the wall.

It holds that in the method as explained above the computer is at least provided with information about at least one attenuation coefficient of the wall material or wall materials for the used radiation and/or the function of attenuation of the wall thickness of the wall material or wall materials for the used radiation and information about the transmitted positions and directions of the radiation relative to the object and the used position and used optionally the orientation of the radiation detector relative to the object and/or information which can be derived there from such as an expected attenuation of the radiation when the radiation has travelled through the object as a function of (local) wall thicknesses of the at least one first portion of the wall, optionally the second portions of the wall and travelling directions and positions relative to the object of the radiation travelling through the object. Furthermore by means of the computer an estimated position and shape of the inner surface of the at least one first portion of the wall is calculated and optionally an estimated position and shape of the inner surfaces of the second portions of the wall on the basis of the registered radiation images on the one hand and on the basis of at least the information provided to the computer on the other hand is calculated.

Hence, it holds also that in that case by means of the computer, an estimated position and shape of the inner surface of the first portion and optionally an estimated position and shape of the inner surface of the second portions is calculated on the basis of the registered radiation images on the one hand and on the other hand a provided relation between attenuations of the radiation transmitted by the radiation source, travelling through the object and received by the radiation detector as a function of the attenuation coefficient of the material of the object for the used radiation, possible geometries of the object, the positions of the radiation source relative to the object and the position of radiation detector relative to the object.

The way in which the computer calculates an estimated radiation image may vary. As explained, if the attenuation coefficient $\mu$ of the material for the radiation used is known, the attenuation can be straight forwardly calculated on the basis of the length of the path along which the radiation travels through the wall material. It is however also possible that calibration pieces are used for determining attenuations and thereby determining estimated radiation images for various wall thicknesses and thereby for various positions and shapes of the inner surface of the first portion of the wall, and optionally for various positions and shapes of the outer surface of the first portion of the wall, various positions and shapes of the inner surface of the second portion of the wall and various positions and shapes of the outer surface of the second portions of the wall. The radiation images corresponding therewith are stored in the computer. Based on a predetermined algorithm, the computer can select based on the registered radiation images the best fitting radiation images which are stored and thereby providing an estimated shape and position of the inner surface of the first portion of the wall and optionally a shape and position of the outer surface of the first portion of the wall, a shape and position of the inner surface of the second portion of the wall and/or a shape and position of the second portion of the wall.

It is however also possible that by means of the calibration pieces a relation is obtained between attenuations of the radiation submitted by the radiation source, travelling through the object and received by the radiation detector on the one hand and possible positions and directions of radiation relative to the object and possible local thicknesses of the first portion of the wall and a second portions of the wall on the other hand. Hence, in that case, not the obtained images are stored but the information of the attenuations for the possible positions and directions of the radiation relative to the object and possible local thicknesses of the first portion of the wall and the second portions of the wall are stored. It will be clear that the stored attenuations of the radiation directly correspond to the above referred to stored radiation images. Hence, in both cases it holds that the computer is provided with a relation between attenuations of the radiation transmitted by the radiation source, travelling through the object and received by the radiation detector on the one hand and possible positions and directions of the radiation relative to the object and possible (local) thicknesses of the first portion of the wall and the second portions of the wall on the other hand.

Several variations of the above referred to embodiment are possible. In the method a correction for scattering may be carried out. This can be taken into account by a so-called build-up factor. This provides a corrected expected attenuation of the radiation when the radiation has travelled through the object as a function of (local) wall thicknesses of the first portion of the wall and (local) wall thicknesses of the second portions of the wall, the travelling direction of the radiation relative to the object and the position of the radiation relative to the object. In view of the above it will also be clear for the skilled man that apart for a correction for scattering it is also possible to carry out a correction for hardening. It is also possible to apply for a correction of a different attenuation coefficient for the material of the weld. If the attenuation coefficient for the used radiation for the material of the weld is known, it is possible to calculated expected attenuations and thereby approximated radiation images in a similar way as discussed above. It is also possible to obtain the expected attenuations and the approximated radiation images while using calibration pieces comprising in addition to the material of the pipeline also the material of the weld.

As discussed the computer may be provided with a first estimation of the position and shape of the outer surface of the at least one first portion of the wall and a first estimation of the position and shape of the outer surface of the second portions of the wall is provided. Subsequently, as explained, better estimations of the position and shape of the outer surface of the first portion of the wall and the position and shape of the outer surface of the second portion of the wall can be obtained on the basis of the radiation images.

It may also be that the position and shape of the outer surface is not known. In that case a first estimation of the position and shape of the outer surfaces of the at least one first portion of the wall and of the second portions of the wall may be generated by the computer itself and subsequently better estimation may be calculated as explained. In that case the position and shape of the inner surface of the at least one first portion of the wall may be calculated as explained before.

It may also be (in addition to the above position and shape of the outer surface being unknown or not) that the position and shape of the inner surface of the second portions of the wall is not known. In that case a first estimation of the position and shape of the inner surface of the second portions of the wall may be generated by the computer itself. In that case the position and shape of the inner surface of the at least one first portion of the wall may be calculated as explained above. Also a subsequently better position and shape of the second portions of the wall may be generated as discussed above.

The position and shape of the outer surface of the first portion of the wall and the position and shape of the outer surface of the second portions of the wall as a first estimation or a fixed information as discussed above, can be obtained in a method wherein the object is provided with markers 34 on the outer surface of at least the first portion and the second portions of the wall and wherein by means of the radiation source, radiation detector and computer the positions of the markers is obtained by computed planer tomography or computed laminography. On the basis of the positions of these markers, the position and shape of the outer surface of the first portion and the second portion of the wall can be obtained. The position of the markers may be obtained by translational laminography or for example rotational laminography. In this example the position of the markers is obtained by translational laminography because the radiation source can be translated in the direction 22. Preferable the computed planar tomography or computed laminography is carried out on the basis of the same measurement which is carried out by means of the radiation source and the radiation detector for determining at least the shape and position of the inner surface of the first portion of the wall and, as discussed, optionally the outer surface of the first portion of the wall, and the inner surface and/or the outer surface of the second portion of the wall.

The above referred to method is carried out for the first portion of the wall. It is however also possible to carry out the method for a plurality of different first portions of the wall. Preferably said plurality of first portions of the wall are adjacent so that the plurality of first portions of the wall extends over uninterrupted larger portion of the wall.

The system is also suitable for carrying out a method wherein by means of the radiation source, radiation detector and computer an image of the material of the first portion of the wall is obtained by computed planar tomography or computed laminography such that said image of the material shows information about the position and shape of inhomogeneities in the material. In the present example this image lays in the plane of the drawing of FIG. 1. In this example the image of the material also covers the inner surface of the first portion of the wall including its bordering surroundings outside the wall and said image of the material also covers the outer surface of the first portion of the wall including its bordering surroundings outside the wall. In computed planar tomography or computed laminography several radiation images are detected wherein the radiation source is in a plurality of different positions relative to the object as discussed above. As will be clear from FIG. 1 there will not be a situation wherein the direction 32 of the radiation is in the actual direction 22 of the object. This has as a known result that inhomogeneities which extend in the direction 22 as well as the inner and outer surfaces of the object insofar they also extend in the direction 22 will not be detected. This is known as a so-called dead angle problem. The obtained image of the material is shown in FIG. 2a. FIG. 2a also comprises said image of the material of the first portion 26 of the wall. It is clear that FIG. 2a indeed does not show which portion of the figure belongs to the material of the wall and which portion belongs to the surrounding of the wall.

In FIG. 2b the position and shape of the inner surface of the first portion of the wall as well as the position and shape of the outer surface of the first portion of the wall is shown. This position and shape of the inner and outer first portion of the wall is obtained by any of the above discussed methods. Subsequently by the computer the information of FIGS. 2a and 2b is combined in such a way that in FIG. 2a those portions which lay outside the wall, are made black. The result of this is shown in FIG. 2c. Clearly, in FIG. 2c information about the position and shape of the inner surface and the outer surface of the first portion of the wall is shown. Hence, it holds that the method further comprises the steps of combining by means of the at least one computer the image of the material of the at least one first portion of the wall and the obtained position and shape of the inner surface of the at least one first portion of the wall so as to obtain a second image which shows information about the position and shape of said inhomogeneities of the material in the at least one first portion of the wall in combination with information about the position and shape of the inner surface of the at least one first portion of the wall. It further holds that the method further comprises the steps of combining by means of the at least one computer the image of the material of the at least one first portion of the wall and the obtained position and shape of the outer surface of the at least one first portion of the wall so as to obtain the second image which shows information about the position and shape of said inhomogeneities of the material in the at least one first portion of the wall in combination with information about the position and shape of the inner surface and the outer surface of the at least one first portion of the wall.

It is noted that in the example of FIG. 2A the image of the material of a plurality of first portions of the wall 26, 26', 26", 26''', 26$^{(4)}$, 26$^{(5)}$ is obtained. In the example the plurality of these first portions of the wall are adjacent so that a large image of the material of the wall is obtained. Also the position and shape of the inner surface and the outer surface of this plurality of first portions of the wall is obtained by means of a method according to the invention as discussed above. Consequently FIGS. 2A, 2B and 2C show images of this plurality of first portions of the wall.

It holds further that the image of the material at least comprises an image of the material laying in a plane which extends through the inner surface and the outer surface of the at least one first portion of the wall wherein the second image shows the position and shape of the inner surface of the at least one first portion and the outer surface of the at least one first portion respectively said inner surface and outer surface each being a line segment laying in said plane. Also it holds in this method that the radiation detector is stationary relative to the object. Such method has the advantage that it can be carried out with relatively low costs. The above referred to planar tomography or computed laminography for obtaining the image of the material can be applied by means of a reconstruction method such as FBR or ART. The same applies to the above referred to computed planar tomography and computed laminography for obtaining the positions of the markers.

It is further possible that in the referred to reconstruction methods such as FBR or ART, information about the determined position and shape of the inner surface of the at least one first portion and/or the determined position and shape of the inner surface of the second portions, and/or the determined position and shape of the outer surface of the at least one first portion and/or the determined position and shape of the outer surface of the second portions is used for further improving the accuracy of these reconstruction methods. It is for example possible to apply a logical back projection of the object surfaces on the basis of other reconstructions (for example by means of an add-function). It is also possible to ly back projection methods using the calculated projections as discussed to fill in the failing projections in computed laminography and planar tomography.

In each of the above discussed examples, instead of a fan beam also other beams such as at least substantially parallel beams or cone beam may be used. Furthermore the radiation source as well as the radiation detector may each be provided with a collimator. In this way scattering may be diminished. In the examples provided above the determined position and shape of a surface is in fact a line segment of said surface. It is also possible to that the determined position and shape of the surfaces is two dimensional and forms a segment of a plane of the inner and outer surfaces. Respectively in FIG. 1 this can for example be applied by repeating the discussed method after the object has been rotated around its axial axis 22. In that case the plane segments are formed by a plurality of line segments which are adjacent to each other. If instead of a fan beam a cone beam is used and in case the detector 14 is a flat plate detector, the at least one first portion of the wall is not radiated by the radiation along a line segment but instead along a plane segment. In that case the shape and position of the inner and/or outer surfaces of the at least one first portion of the wall can be obtained directly in two dimensions and forms a plane segment of the inner and outer surface of the first position of the wall. In the example given the detector 14 may however also be a line detector extending in the direction 22. It may also be a point detection which is movable in the direction 22 for building up an image by scanning in the direction x extending in the direction x. It may also be a line detector moveable in the direction 22 and extending perpendicular to the drawing. Furthermore in the example the radiation source is moved along a straight line in a longitudinal direction of the object. It is however also possible that the radiation source is moved along another predetermined path deviating from a straight line.

Figure 3:
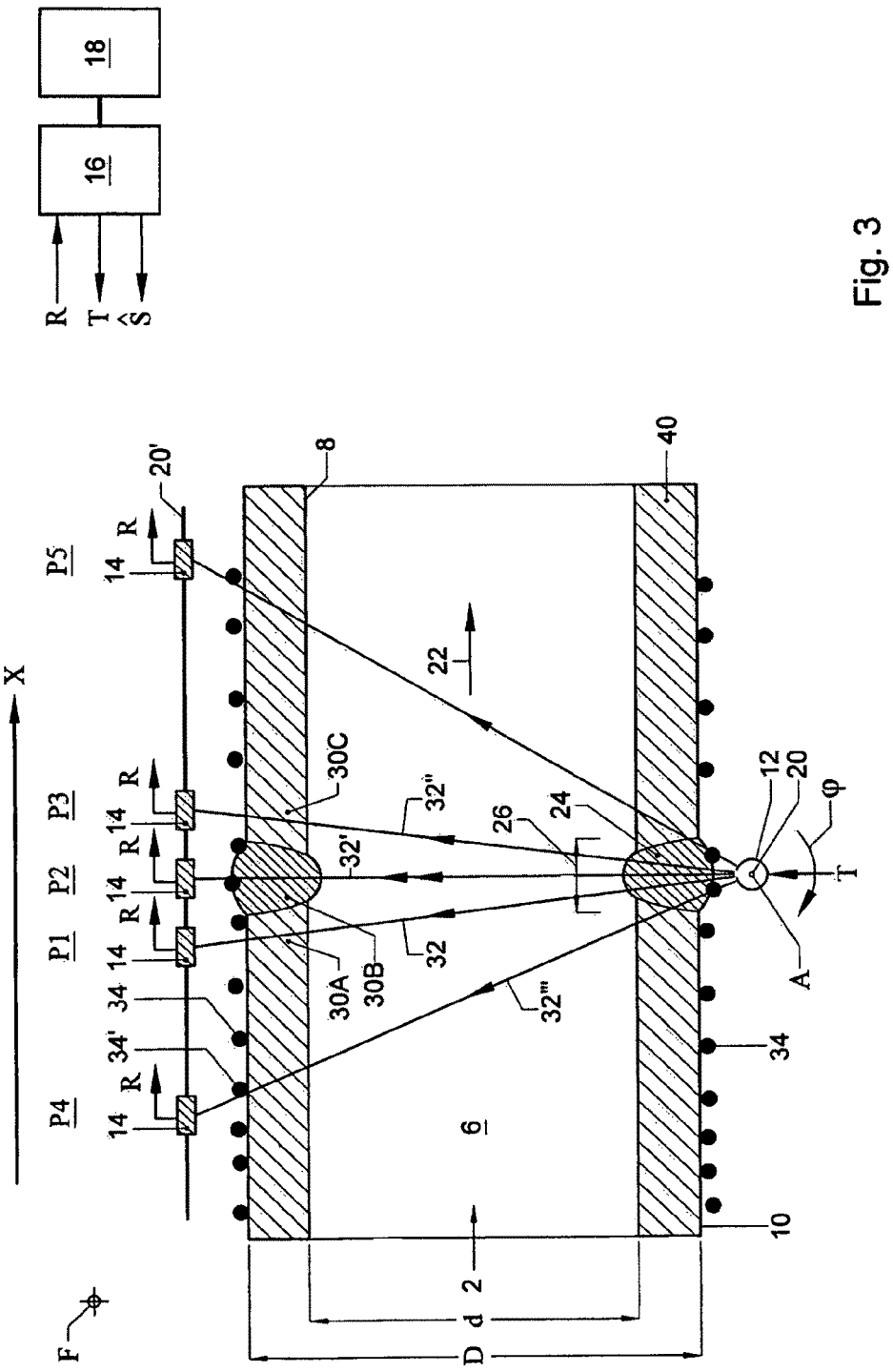
FIG. 3 shows a first alternative system according to the invention for carrying out a method according to the invention.

An alternative embodiment of the invention is shown in FIG. 3. In FIG. 3 the radiation source 12 is movable in the direction 22 as discussed with FIG. 1. Moreover the orientation of the radiation source 12 can be changed by means of a transport device 20 which is schematically shown by a dot in FIG. 3. Furthermore, in FIG. 3 the position in the direction x of the radiation detector 14 may be changed by the transport device 20' which is schematically shown as a line in FIG. 3.

At one time the radiation source 12 is orientated in such a direction (as shown in FIG. 3) that it transmits radiation through the first portion of the wall 26 and through the second portion of the wall 30Aa. A radiation image is obtained by the radiation plate detector 14 which is in the position P1. Information about the radiation image is submitted to the computer 16.

Subsequently the computer 16 controls the transport device 20 such that the radiation detector 12 rotates around the axis A in the direction of the angle φ. Furthermore, the computer 16 controls the transport device 20' so that the radiation detector 14 is moved to the position P2. Now the radiation detector transmits in the direction 32' radiation through the first portion 26 of the wall which radiation also travels through the second portion of the wall 30B. A radiation image is created by means of the detector 14 wherein information about the radiation image is submitted again to the computer 16. Subsequently under control of the computer the radiation source is further rotated around the axis A so that it transmits radiation in the direction 32" wherein the radiation travels through the first portion of the wall as well as through the second portion 30C of the wall wherein again a radiation image is obtained information of which is submitted to the computer 16. Than the radiation source is moved to another position as discussed for FIG. 1 and more radiation images are obtained for different orientations of the radiation source as discussed above. Based on these radiation images the position and shape of the inner surface of the wall of the first portion can be obtained in the same manner as discussed above. The same applies to the possible determination of the position and shape of the other portions of the wall as discussed above. Furthermore the position of the markers 34 can also be obtained by transmission of the radiation in several directions and by detection these radiations by means of the radiation detector. For example when the radiation is transmitted in the direction 32''' one of the markers denoted as 34' may be detected. Also by means of rotating the radiation source 12 and at the same time moving the radiation detector 14 so that radiation which travels through the wall 8 of the object is detected, an image of the material of the wall can be obtained by methods such as computers tomography with a limited viewing angle, Planar tomography or Computed laminography.

Figure 4:
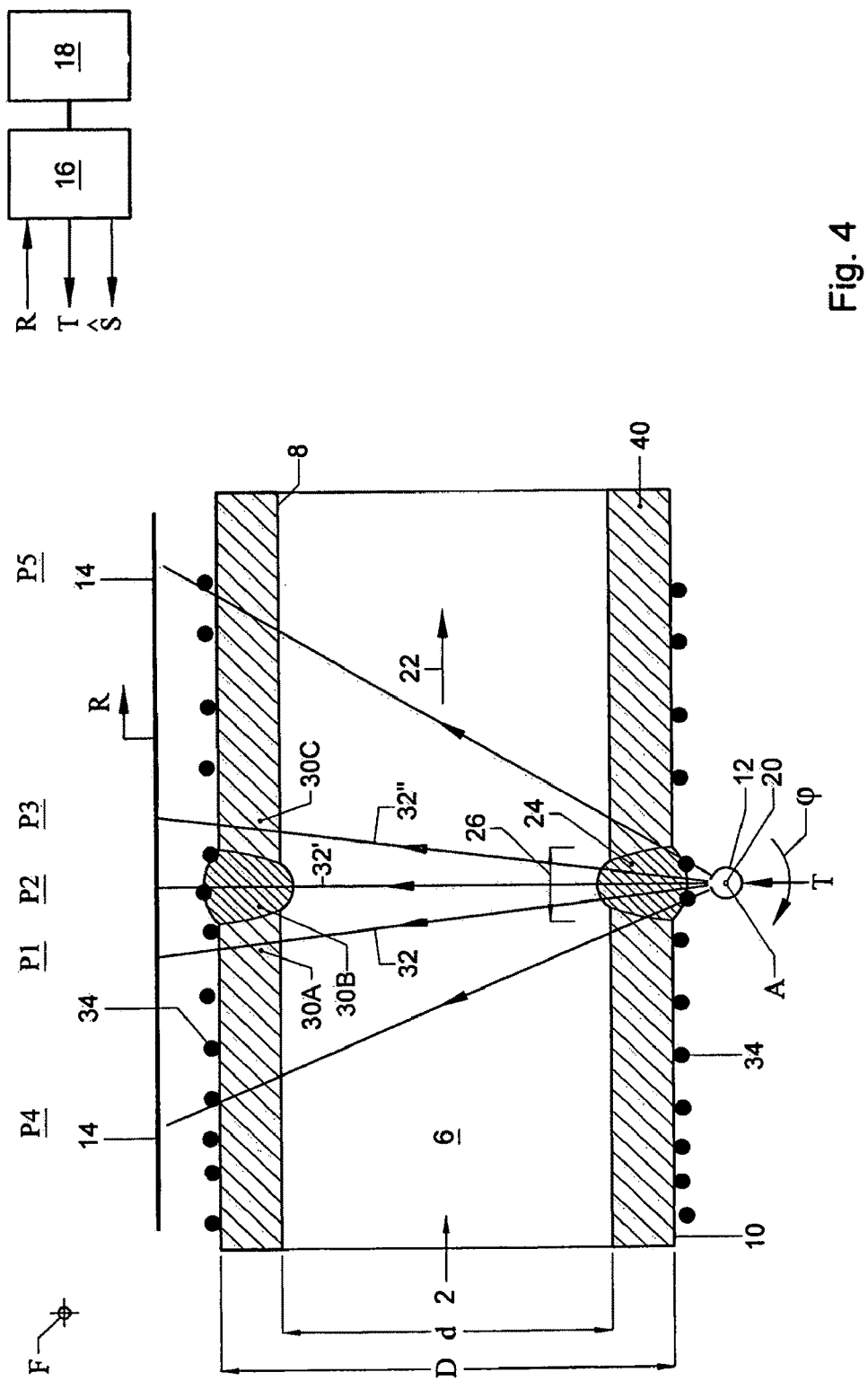
FIG. 4 shows a second alternative system according to the invention for carrying out a method according to the invention.

FIG. 4 shows an alternative embodiment which is highly similar to the embodiment as discussed in FIG. 3. In FIG. 4 the plate detector 14 is so large that it can receive the radiation submitted by the radiation source 12 in each of the above referred to orientations around the axis A. Hence each of the images discussed can be received by the single detector 14 which may be in this example a plate detector or line detector.

Finally it is remarked that in FIG. 1 the plate detector may also be replaced by a detector which is moveable in the direction R as discussed for FIG. 3 so that the same information can be obtained by means of the plate detector of FIG. 1.

In this example the inner space of the object is empty. It is however also possible that the inner space of the object is filled, for example with a liquid. In that case the method as discussed above can be carried out as well. The attenuation of the liquid can be taken into account by determining its attenuation coefficient for the applied radiation. In case the attenuation coefficient is known, it can be estimated what the additional attenuation of the radiation will be due to the liquid in the inner space. In this manner the method can be carried out accordingly as discussed above. It is also possible to use calibration pieces having the same geometry as the object in FIG. 1 which are filled with said liquid. In that case the calibration pieces can be used in a similar manner as discussed above for applying a method in a similar manner as discussed above. In each of the examples it holds that the position of the radiation source relative to the object is changed a plurality of times, preferably at least three times, more preferably at least four times, more preferably at least ten times in the axial direction of the object for obtaining a plurality of different radiation images, preferably at least three different radiation images, more preferably at least four different radiation images, more preferably at least ten different radiation images which are used in step f. for carrying out said calculations.

Such modifications each fall within the scope of the present invention.

The invention claimed is:

1. A method of carrying out measurements with penetrating radiation on a hollow object having an axial axis, comprising at least one wall surrounding an inner space of the object, said wall comprising an inner surface and an outer surface, said method at least being carried out for determining a position and shape of the inner surface of at least a first portion of the wall and comprising the following steps:
   a. transmitting radiation through the object such that the radiation is transmitted through at least the at least one first portion of the wall to be examined and through other second portions of the wall of the object by means of at least one radiation source;
   b. receiving radiation which has travelled through said portions of the wall by means of at least one detector unit for registering at least one radiation image of the object, said at least one radiation image representing the positions where the radiation is received together with the intensity of the received radiation on said positions;
   c. creating signals by means of at least the at least one detector unit which signals represent the registered at least one radiation image;
   d. feeding said signals to at least one computer;
   e. providing the computer at least with (i) information about at least one attenuation coefficient of the wall material or wall materials for the used radiation and/or the function of attenuation of the wall thickness of the wall material or wall materials for the used radiation, (ii) information about the used positions and directions of the transmitted radiation relative to the object and (iii) at least the at least one used position of the radiation detector relative to the object and/or information which can be derived there from (i, ii, iii);
   f. calculating by means of the computer at least an estimated position and shape of the inner surface of the at least one first portion of the wall on the basis of the registered at least one radiation image on the one hand and on the basis of at least the information provided in step e. on the other hand;
   g. changing in step a. at least one time the position of the radiation source relative to the object in a direction comprising at least a component in the direction of the axial axis such that in step a. the radiation is first transmitted through the object wherein the radiation is transmitted through at least the at least one first portion of the wall to be examined and through one of the second portions of the wall by means of the at least one radiation source for registering a first radiation image and such that in step a. after the position of the radiation source is changed at least one time the radiation is subsequently transmitted through at least the at least one first portion of the wall to be examined and through a second portion of the wall which differs from a second portion of the wall through which the radiation was previously transmitted, for registering at least one further radiation image which differs from the previously obtained radiation image, wherein the directions of the transmitted radiation relative to the first portion of the wall changes if the radiation source is moved in the direction having a component in the direction of the axial axis, said first registered radiation image and said at least one further registered radiation image being used in step f. for carrying out said calculations.

2. The method according to claim 1 characterised in that in step f. by means of the computer at least an estimated position and shape of the inner surface of the at least one first portion of the wall is calculated on the basis of the registered radiation images on the one hand and on the other hand on the basis of a provided relation between attenuations of the radiation transmitted by the radiation source, travelling through the object and received by the radiation detector on the one hand and possible positions and directions of the radiation relative to the object and possible thicknesses of the at least one first portion of the wall and the second portions of the wall on the other hand.

3. The method according to claim 1, characterised that in step f. by means of the computer at least an estimated position and shape of the inner surface of the first portion of the wall is calculated on the basis of the registered radiation images on the one hand and on the other hand on the basis of a provided relation between attenuations of the radiation transmitted by the radiation source, travelling through the object and received by the radiation detector on the one hand and the at least one attenuation coefficient of the material of the object for the used radiation, possible geometries of the object, at least the used positions of the radiation source relative to the object or the places and directions of the radiation relative to the object, and at least the used at least one position of the radiation detector relative to the object on the other hand.

4. The method according to claim 1, characterised in that in step f. at least an estimated position and shape of the inner surface of the at least one first portion of the wall and an estimated position and shape of the outer surface of the at least one first portion of the wall is calculated on the basis of the registered radiation images on the one hand and on the other hand on the basis of at least the information provided in step e.

5. The method according to claim 4, characterised in that in step f. at least an estimated position and shape of the inner surface of the at least one first portion of the wall and an estimated position and shape of the outer surface of the at least one first portion of the wall are calculated on the basis of the registered radiation images on the one hand and on the other hand on the basis of a provided relation between attenuations of the radiation transmitted by the radiation source, travelling through the object and received by the radiation detector on the one hand and possible positions and directions of the radiation relative to the object and possible thicknesses of the at least one first portion of the wall and second portions of the wall on the other hand.

6. The method according to claim 4, characterised that in step f. by means of the computer at least an estimated position and shape of the inner surface of the at least one first portion of the wall and the outer surface of the at least one first portion of the wall is calculated on the basis of the registered radiation images on the one hand and on the other hand on the basis of a provided relation between attenuations of the radiation transmitted by the radiation source, travelling through the object and received by the radiation detector on the one hand the at least one of the attenuation coefficient of the material of the object for the used radiation, possible geometries of the object, at least the used positions of the radiation source relative to the object or the places and directions of the radiation relative to the object, and at least the used at least one position of the radiation detector relative to the object on the other hand.

7. The method according to claim 1, characterised in that the method further comprises the step of:
h. providing the computer with information about a position and shape of the outer surface of the at least one first portion of the wall and with information about a position and shape of the outer surface of the other at least one second portion of the wall, said information also being used in step f. in combination with the information provided in step e. to the computer for carrying out set calculations.

8. The method according to claim 7, characterised in that in step h. a first estimation of the position and shape of the outer surface of the at least one first portion of the wall and a first estimation of the position and shape of the outer surface of the second portions of the wall is provided.

9. The method according to claim 7, characterised in that the following steps are carried out for carrying out step f:
i. determining by means of the computer approximated radiation images when said radiation source is in said positions relative to the object, said determination for obtaining approximated radiation images being carried out by means of a first predetermined algorithm which is applied on the basis of the provided positions and shapes of the outer surfaces in step h. or a first estimation of the positions and shapes of the outer surfaces, at least on the basis of the used positions of the radiation source relative to the object, at least the used at least one position of the radiation detector relative to the object and an estimation of the positions and shapes of the inner surfaces of the at least one first portion of the wall and the second portions of the wall and on the basis of the information of the at least one attenuation coefficient of the material of the wall for the used radiation and the geometry of the object or information which can be derived there from;
j. calculating by means of the computer differences between the approximated radiation images and the respective corresponding registered radiation images;
k. calculating by means of a second predetermined algorithm as a function of the calculated differences at least a new estimated position and shape of the inner surface of the at least one first portion of the wall;
l. repeating steps j. and k. until the differences obtained in step j. fulfill a predetermined requirement;
m. providing the estimated position and shape of the inner surface of the at least one first portion of the wall belonging to differences which fulfill the predetermined requirement.

10. The method according to claim 9, characterised in that in steps i., j., k. and l. an iterative method for obtaining a best fit between the approximated radiation images and the registered radiation images based on an least square root method is carried out.

11. The method according to claim 9, characterised in that in said first algorithm each of said approximated radiation image is obtained by calculating an expected attenuation of the radiation caused by the travelling of the radiation through said portions of the wall, said attenuation depending on the length of the path along which the radiation travels in the material and the at least one attenuation coefficient of the material for the used radiation wherein the length of said path depends at least on the position of the radiation source relative to the object, the position and shape of the outer surface of the at least one first portion of the wall, the position and shape of the estimated inner surface of the at least one first portion of the wall, the position and shape of the outer surface of the second portions of the wall or a far estimation there from and the position and shape of the estimated inner surface of the second portions of the wall.

12. The method according to claim 7, characterised in that the method further comprises step n. wherein the object is provided with markers on the outer surfaces of the at least one first portion of the wall and the second portions of the wall and wherein by means of the radiation source, radiation detector and the computer the positions of the markers is obtained by another method, wherein the computer in step h. is provided with the position and shape of the outer surface of the at least one first portion of the wall and the position and shape of the outer surface of the second portions of the wall on the basis of the obtained positions of the markers.

13. The method according to claim 12, characterised in that, the position of the markers is obtained by translational laminography or rotational laminography.

14. The method according to claim 1, characterised in that the shape of the inner surfaces and the shape of the outer surfaces are formed by a line segment of said inner and outer surfaces respectively.

15. The method according to claim 1, characterised in that the outer shapes of the surfaces are formed by plane segments of said inner and outer surfaces respectively.

16. The method according to claim 1, characterised in that in step g. of claim 1 the radiation source is moved along a straight line.

17. The method according to claim 14, characterised in that in step g. the radiation source is moved along a straight line and in that the line segments run parallel to the straight line.

18. The method according to claim 1, characterised in that the radiation source generates a fan beam.

19. The method according to claim 17, characterised in that the radiation source generates a fan beam and in that the line segments run in a plane of the fan beam.

20. The method according to claim 15, characterised in that the radiation source generates a fan beam wherein that the line segments run in a plane of the fan beam and wherein the plane segments are formed by a plurality of the line segments which are adjacent to each other.

21. The method according to claim 1, characterised in that the radiation source generates a cone beam or at least substantially parallel beams.

22. The method according to claim 18, characterised in that the radiation source and/or the radiation detector is provided with a collimator.

23. The method according to claim 1, characterised in that the object has a longitudinal shape.

24. The method according to claim 14, characterised in that the straight line extends in the axial direction of the object.

25. The method according to claims 14, characterised in that the line segments extend in the axial direction of the object.

26. The method according to claim 23, characterised in that the object is a pipeline.

27. The method according to claim 26, characterised in that the inner surface of the at least one first portion of the wall comprised at least a portion of a weld of the pipeline.

28. The method according to claim 1, characterised in that the method further comprises step o. wherein by means of the radiation source, the radiation detector and the computer an image of the material of the at least one first portion of the wall is obtained by another method such a computed tomography, computed planar tomography or computed laminography such that said image of the material shows information about the position and shape of inhomogeneities in the material.

29. The method according to claim 28, characterised in that said image of the material also covers the inner surface of the at least one first portion of the wall including its bordering surroundings outside the wall.

30. The method according to claim 29, characterised in that said method further comprises the step of:
   p. combining by means of the at least one computer the image of the material of the at least one first portion of the wall and the obtained position and shape of the inner surface of the at least one first portion of the wall so as to obtain a second image which shows information about the position and shape of said inhomogeneities of the material in the at least one first portion of the wall in combination with information about the position and shape of the inner surface of the at least one first portion of the wall.

31. The method according to claim 29, characterised in that said method further comprises the step of:
   q. combining by means of the at least one computer the image of the material of the at least one first portion of the wall and the obtained position and shape of the outer surface of the at least one first portion of the wall so as to obtain the second image which shows information about the position and shape of said inhomogeneities of the material in the at least one first portion of the wall in combination with information about the position and shape of the inner surface and the outer surface of the at least one first portion of the wall.

32. The method of claim 28, characterised in that the image of the material at least comprises an image of the material laying in a plane which extends through the inner surface and the outer surface of the at least one first portion of the wall wherein the second image shows the position and shape of the inner surface of the at least one first portion of the wall and the outer surface of the at least one first portion of the wall respectively said inner surface and outer surface each being a line segment laying in said plane.

33. The method according to claim 28, characterised in that said image of the material of the at least one first portion of the wall and the shape and position of the inner surface of the at least one first portion of the wall are obtained on the basis of one and the same measurement which is carried out by means of the radiations source and the radiation detector.

34. The method according to claim 12, characterised in that the other method comprises computed planar tomography or computed laminography wherein the computed planar tomography or computed laminography and the determination of the shape and position of the inner surface of the at least one first portion of the wall are obtained on the basis of one and the same measurement which is carried out by means of the radiations source and the radiation detector.

35. The method according to claim 12, characterised in that, in step n. a reconstruction method is used, wherein in said reconstruction methods information about the determined position and shape of the inner surface of the at least one first portion of the wall and/or the determined position and shape of the inner surface of the second portions of the wall and/or the determined position and shape of the outer surface of the at least one first portion of the wall and/or the determined position and shape of the outer surface of the second portions of the wall are used.

36. The method according to claim 1, characterised in that the radiation detector is stationary relative to the object.

37. The method according to claim 1, characterised in that the radiation detector is stationary relative to the radiation source.

38. The method according to claim 1, characterised in that the radiation detector is a flat panel detector, digital detector arrays or a line detector or a line detector arrays.

39. The method according to claim 1, characterised in that, the information provided to the computer in step e. is obtained by a calibration measurement.

40. The method according to claim 1, characterised in that the information provided to the computer in step e. is obtained by measuring attenuations of the radiation in calibration pieces.

41. The method according to claim 1, characterised in that the object is filled with a substance wherein in the method a correction for attenuation of the radiation by the substance is carried out.

42. The method according to claim 1, characterised in that in the method a correction for scattering is carried out.

43. The method according to claim 1, characterised in that in the method a change in the spectrum by wall thickness change is carried out.

44. The method according to claim 1, characterised in that the method is carried out for a plurality of different first portions of the wall.

45. The method according to claim 44, characterised in that the plurality of first portions of the wall are adjacent.

46. The method according to claim 1, characterized in that in step g. the position of the radiation source relative to the object is changed a plurality of times in a direction having a component in the direction of the axial axis of the object for obtaining a plurality of different radiation images, which radiation images are used in step f. for carrying out said calculations.

47. A method of carrying out irradiation test on hollow objects comprising a wall surrounding an inner space of the object, in order to determine the position and shape of inhomogeneities of material of the wall, said wall comprising an inner surface and an outer surface, said method comprising the steps of:
   a. transmitting radiation through the object such that the radiation is transmitted through at least at least one first portion of the wall to be examined and through another second portion of the wall of the object by means of at least one radiation source;
   b. receiving radiation which has travelled through said portions of the wall by means of at least one detector unit for registering at least one radiation image of the object, said radiation image representing the positions on the detector where the radiation is received together with the intensity of the received radiation on said positions;
   c. creating signals by means of the at least one detector unit which signals represent the registered radiation image;
   d. feeding said signals to at least one computer;
   e. creating a first image of the material of said at least one first portion of the wall by means of said computer and based on said signals, such that said first image shows information about the position and shape of said inhomgeneities and covers also at least a portion of the inner surface of the at least one first portion of the wall including its bordering surroundings outside the wall and at least a portion of the outer surface of the at least one first portion of the wall including its bordering surroundings outside the wall;
   f. calculating by means of the computer at least an estimated position and shape of the inner surface of the at least one first portion of the wall on the basis of the at least one registered radiation image on the one hand and on the other hand on the basis of a provided relation between attenuations of the radiation transmitted by the radiation source, travelling through the object and received by the radiation detector, the at least one attenuation coefficient of the wall material of the object for the used radiation or wall materials and/or the function of attenuation of the wall thickness of the wall material or wall materials for the used radiation, and the direction and position of the radiation relative to the object;
   g. combining by means of the at least one computer the first image of the material and the obtained position and shape of the inner surface of the at least one first portion of the wall so as to obtain a second image which shows information about the position and shape of said inhomogeneities of the material in the at least one first portion of the wall in combination with information about the position and shape of the inner surface of the at least one first portion of the wall.

48. The method according to claim 47, characterised in that the method further comprises the step of:
   h. combining by means of the at least one computer the first image of the material and the obtained position and shape of the outer surface of the at least one first portion of the wall so as to obtain a second image which shows information about the position and shape of said inhomogeneities of the material in the at least one first portion of the wall in combination with also information about the position and shape of the inner surface of the a least one first portion of the wall.

49. The method according to claim 47, characterised in that step f. is carried out at least two or three times wherein the radiation source has at least two or three mutually different positions relative to the object respectively, wherein in step g. each registered radiation image is compared with corresponding expected attenuations and based thereon an estimated position and shape of the inner surface of the at least one first portion of the wall is calculated.

50. The method according to claim 47, characterised in that, the object is a hollow pipeline wherein the first image extends in a plane extending in axial and radial direction of the pipeline and wherein the obtained position and shape of the inner surface of the at least one first portion of the wall is a line segment extending through the first image.

51. The method according to claim 49, characterised in the object is a hollow pipeline wherein the first image extends in a plane extending in axial and radial direction of the pipeline and wherein the obtained position and shape of the inner surface of the at least one first portion of the wall is a line segment extending through the first image and in that the at least two or three positions lay a line running parallel to an axial direction of the pipeline.

52. The method according to claim 47, characterised in that the at least one first portion of the wall comprises a weld.

53. The method according to claim 47, characterised in that, the first image is obtained by computed planar tomography or computed laminography.

54. The method according to claim 53, characterised in that, the first image is obtained by translational laminography or rotational laminography.

55. The method according to claim 47, characterised in that a fanbeam, cone beam or at least substantially parallel beam is generated by means of the radiation source.

56. The method according to claim 47, characterised in that the method is carried out for a plurality of different first portions of the wall.

57. The method according to claim 56, characterised in that the plurality of first portions of the wall are adjacent.

58. The method according to claim 1, characterised in that, in step a. the radiation is transmitted through the object from outside the object and/or in step b the radiation is received outside the object.

59. The method according to claim 1, characterised in that in step a. the radiation is transmitted through the object such that the radiation at least extends generally in a plane which is parallel to the axial axis or such that the radiation at least extends in a plane wherein the axial axis lays in the plane, wherein the radiation in addition may also extend outside the plane.

60. A system for carrying out the method according to claim 1, provided with at least radiation source, at least one a radiation detector, at least one transport device for changing the position and/or orientation of the radiation source and/or the position of the radiation detector relative to the object and a computer comprising software for carrying out the calculations of the method, said software being stored on a non-transitory storage medium.

61. The system according to claim 60, characterised in that the computer comprises software to control the transport device, said software being stored on a non-transitory storage medium.

62. The method according to claim 1, characterized in that in step e. the computer is provided with (iii) the at least one used position and the used at least one orientation of the radiation detector relative to the object and/or information which can be derived there from wherein in step f. the calculations are carried out on the basis of the at least one used position of the radiation detector and the used at least one orientation of the radiation detector relative to the object.

63. The method according to claim 1, characterised in that in step f. the calculation by means of the computer also includes the calculation of an estimated position and shape of the inner surfaces of the second portions of the wall on the same basis as the basis on which the estimated position and shape of the inner surface of the at least one first portion of the wall is calculated.

64. The method according to claim 3, characterised in that in step f. the calculations are carried out on the basis of the at least one used position of the radiation source and the used at least one orientation of the radiation source.

65. The method according to claim 4, characterized in that in step f. an estimated position and shape of the inner surfaces of the second portions of the wall and/or an estimated position and shape of the outer surface of the second portions of the wall are calculated on the same basis as the basis whereon the estimated position and shape of the inner surface of the at least one first portion of the wall and the estimated position and shape of the outer surface of the at least one first portion of the wall is calculated.

66. The method according to claim 9, wherein in step k. the following is also carried out: calculating by means of the second predetermined algorithm as a function of the calculated differences at least one of a new estimated position and shape of the inner surface of the second portions of the wall or a new estimated position and shape of the outer surface of the at least one first portion of the wall or a new estimated position and shape of the outer surface of the second portions of the wall.

67. The method according to claim 29, characterized in that said image of the material also covers the outer surface of the at least one first portion of the wall including its bordering surroundings outside the wall.

68. The method according to claim 47, characterised in that, in step f an estimated position and shape of the outer surface of the at least one first portion of the wall is calculated on the same basis as the basis whereon the estimated position and shape of the inner surface of the at least one first portion of the wall is calculated.

69. The method according to claim 47, characterised in that, in step a. the radiation is transmitted through the object from outside the object and/or in step b the radiation is received outside the object.

70. The method according to claim 47, characterised in that in step a. the radiation is transmitted through the object such that the radiation at least extends generally in a plane which is parallel to the axial axis or such that the radiation at least extends in a plane wherein the axial axis lays in the plane, wherein the radiation in addition may also extend outside the plane.

71. A system for carrying out the method according to claim 47, provided with at least radiation source, at least one a radiation detector, at least one transport device for changing the position and/or orientation of the radiation source and/or the position of the radiation detector relative to the object and a computer comprising software for carrying out the calculations of the method, said software being stored on a non-transitory storage medium.

* * * * *